United States Patent
Wang

(10) Patent No.: US 10,943,372 B2
(45) Date of Patent: Mar. 9, 2021

(54) GUI DISPLAY METHOD AND APPARATUS, AND TERMINAL DEVICE

(71) Applicant: Tencent Technology (Shenzhen) Company Limited, Shenzhen (CN)

(72) Inventor: Junming Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 587 days.

(21) Appl. No.: 15/331,265

(22) Filed: Oct. 21, 2016

(65) Prior Publication Data

US 2017/0039733 A1 Feb. 9, 2017

Related U.S. Application Data

(63) Continuation of application No. PCT/CN2015/077051, filed on Apr. 21, 2015.

(30) Foreign Application Priority Data

Apr. 22, 2014 (CN) .......................... 201410164330.4

(51) Int. Cl.
| | |
|---|---|
| G06F 9/451 | (2018.01) |
| G06F 3/0484 | (2013.01) |
| G06T 11/00 | (2006.01) |

(52) U.S. Cl.
CPC ........ *G06T 11/001* (2013.01); *G06F 3/04842* (2013.01); *G06F 9/451* (2018.02); *G06T 2200/24* (2013.01)

(58) Field of Classification Search
CPC ... G06T 11/001; G06T 2200/24; G06F 9/451; G06F 3/04842
See application file for complete search history.

(56) References Cited

U.S. PATENT DOCUMENTS

| 8,098,259 B2 | 1/2012 | Kondo et al. |
| 9,772,760 B2 | 9/2017 | Luo |

(Continued)

FOREIGN PATENT DOCUMENTS

| CN | 1441346 A | 9/2003 |
| CN | 1731860 A | 2/2006 |

(Continued)

OTHER PUBLICATIONS

International Search Report and Written Opinion for counterpart PCT Application No. PCT/CN2015/077051, dated Jul. 28, 2015 (6 pgs.).

*Primary Examiner* — Jennifer N To
*Assistant Examiner* — Ashley M Fortino
(74) *Attorney, Agent, or Firm* — Anova Law Group, PLLC

(57) ABSTRACT

A graphical user interface (GUI) display method and apparatus, and a terminal device are provided. The method includes: generating a first instruction and a second instruction when it is detected that an interface element of a GUI is operated by a user and a current first display attribute parameter of the interface element does not correspond to a predetermined attribute parameter value; adjusting, in response to the second instruction, a value of a display attribute parameter of the interface element to a second display attribute parameter value; and executing the first instruction and displaying an interface element corresponding to the second display attribute parameter value. In the embodiments of the present invention, an operating manner of adjusting the display attribute of the interface element is convenient and does not interrupt a user operation in the GUI.

9 Claims, 7 Drawing Sheets

(56) References Cited

U.S. PATENT DOCUMENTS

| | | |
|---|---|---|
| 2003/0160821 A1 | 8/2003 | Yoon |
| 2004/0095358 A1* | 5/2004 | Takagi ............... H04N 5/44504 345/589 |
| 2006/0038744 A1 | 2/2006 | Ishimura |
| 2007/0011621 A1 | 1/2007 | Hsu |
| 2011/0128575 A1* | 6/2011 | Iwata ................ H04N 1/00416 358/1.15 |
| 2011/0304584 A1 | 12/2011 | Hwang |
| 2012/0030570 A1 | 2/2012 | Migos |
| 2012/0066621 A1* | 3/2012 | Matsubara .............. A63F 13/53 715/764 |
| 2013/0290874 A1* | 10/2013 | Tan ....................... H04N 7/141 715/756 |

FOREIGN PATENT DOCUMENTS

| | | |
|---|---|---|
| CN | 102369501 A | 3/2012 |
| CN | 103019384 A | 4/2013 |
| CN | 103077701 A | 5/2013 |
| CN | 103197889 A | 7/2013 |
| CN | 103294362 A | 9/2013 |
| CN | 103345355 A | 10/2013 |
| EP | 2420924 A2 | 2/2012 |

\* cited by examiner

GUI DISPLAY METHOD AND APPARATUS, AND TERMINAL DEVICE

This application is a continuation application of PCT Application No. PCT/CN2015/077051 filed on Apr. 21, 2015, which claims priority to Chinese Patent Application No. 201410164330.4, entitled "GUI DISPLAY METHOD AND APPARATUS, AND TERMINAL DEVICE" filed on Apr. 22, 2014. The entire contents of PCT/CN2015/077051 and Chinese Patent Application No. 201410164330.4 are incorporated herein by reference.

TECHNICAL FIELD

The present disclosure relates to the field of graphic processing technologies, and in particular, to a graphical user interface (GUI) display method and apparatus, and a terminal device.

BACKGROUND

A GUI, also referred to as a human-machine interface, refers to a user interface of a computer operating environment displayed in a graphic form, and the GUI may be a set of methods for performing interaction between a user and a computer system.

An element used for performing the interaction between the user and the computer system in the GUI can be referred to as an interface element. The user may enable the computer system to generate a corresponding instruction by operating the interface element, so that the computer system executes the instruction and implements a corresponding instruction function. If an instruction corresponding to the interface element is sending an edited message, the user may enable the computer system to generate a message sending instruction by operating the interface element, so as to send out the edited message.

A basic function of a GUI is performing interaction between a user and a computer system, and therefore, how to facilitate a user operation in a displayed GUI is of most importance; in order to facilitate the user operation, during an actual operation of the user, it is usually necessary to adjust a display attribute of an interface element, for example, to enlarge a display area occupied by the interface element so as to enable the user to operate the interface element in a larger display area, thereby facilitating the user operation.

At present, a main manner of adjusting a display attribute of an interface element is that: a user clicks a setting button of the GUI to enter a setting interface, adjusts a value of a display attribute parameter of the interface element in the setting interface and saves the adjusted display attribute parameter value of the interface element, and then, returns to the GUI, thereby adjusting the display attribute of the interface element. In view of the above, in an existing manner of adjusting a display attribute of an interface element, the operation is complex, it requires to enter a setting interface and exit from the GUI, a situation that a user operation in the GUI is interrupted exists during adjustment of the display attribute of the interface element, and accordingly the user operation in the GUI is inconvenient.

SUMMARY

In view of this, embodiments of the present invention provide a GUI display method and apparatus, and a terminal device, so as to solve problems in an existing manner of adjusting a display attribute of an interface element that an operation is complex, it requires to exit from the GUI, a situation that a user operation in the GUI is interrupted exits, and accordingly the user operation in the GUI is inconvenient.

In order to achieve the foregoing objective, embodiments of the present invention provide the following technical solutions:

A GUI display method includes:

generating a first instruction and a second instruction when it is detected that an interface element of a GUI is operated by a user and a current first display attribute parameter value of the interface element does not correspond to a predetermined display attribute parameter value, the first instruction being used for controlling interface content presented on an interface background of the GUI, and the second instruction being used for triggering an adjustment on a value of a display attribute parameter of the interface element;

adjusting, in response to the second instruction, the value of the display attribute parameter of the interface element to a second display attribute parameter value, a difference between the second display attribute parameter value and the predetermined display attribute parameter value being less than a difference between the first display attribute parameter value and the predetermined display attribute parameter value; and executing the first instruction and displaying an interface element corresponding to the second display attribute parameter value.

The embodiments of the present invention further provide a GUI display apparatus, including:

a first instruction generating module, configured to generate a first instruction and a second instruction when it is detected that an interface element of a GUI is operated by a user and a current first display attribute parameter value of the interface element does not correspond to a predetermined display attribute parameter value, the first instruction being used for controlling interface content presented on an interface background of the GUI, and the second instruction being used for triggering an adjustment on a value of a display attribute parameter of the interface element;

a display attribute adjusting module, configured to adjust, in response to the second instruction, the value of the display attribute parameter of the interface element to a second display attribute parameter value, a difference between the second display attribute parameter value and the predetermined display attribute parameter value being less than a difference between the first display attribute parameter value and the predetermined display attribute parameter value; and a first instruction executing module, configured to execute the first instruction; and a display module, configured to display an interface element corresponding to the second display attribute parameter value.

Embodiments of the present invention further provide a terminal device including the foregoing GUI display apparatus.

On the basis of the foregoing technical solutions, in the GUI display method according to an embodiment of the present invention, when it is necessary to adjust a value of a display attribute parameter because a current first display attribute parameter value of an interface element of a GUI does not correspond to a predetermined display attribute parameter value, a first instruction and a second instruction are generated by operating the interface element, where the first instruction is used for controlling interface content presented on an interface background of the GUI, and the second instruction is used for triggering an adjustment on the value of the display attribute parameter of the interface element; in response to the second instruction, the value of the display attribute parameter of the interface element is adjusted to a second display attribute parameter value, so as to enable the second display attribute parameter value after the adjustment to get close to or reach the predetermined display attribute parameter value; and the first instruction is executed and an interface element corresponding to the second display attribute parameter value is displayed, so as to adjust the display attribute of the interface element while implementing an inherent function of the interface element. In the embodiments of the present invention, when it is necessary to adjust a display attribute of an interface element of a GUI, the interface element that needs to be adjusted can be operated without exiting the GUI, so as to generate a first instruction and a second instruction, and the value of the display attribute parameter of the interface element is adjusted while the first instruction is executed to implement an inherent function of the interface element at the same time, so as to enable the value of the display attribute parameter to get close to or reach a predetermined display attribute parameter value. In the GUI display method according to the embodiment of the present invention, the display attribute of the interface element can be adjusted by operating the interface element without exiting from the GUI, so that an operating manner of adjusting the display attribute of the interface element is convenient and does not interrupt a user operation in the GUI.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts.

DESCRIPTION OF EMBODIMENTS

In order to make objectives, technical solutions, and advantages of embodiments of the present invention more clear, the technical solutions in the embodiments of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present disclosure.

Figure 1:
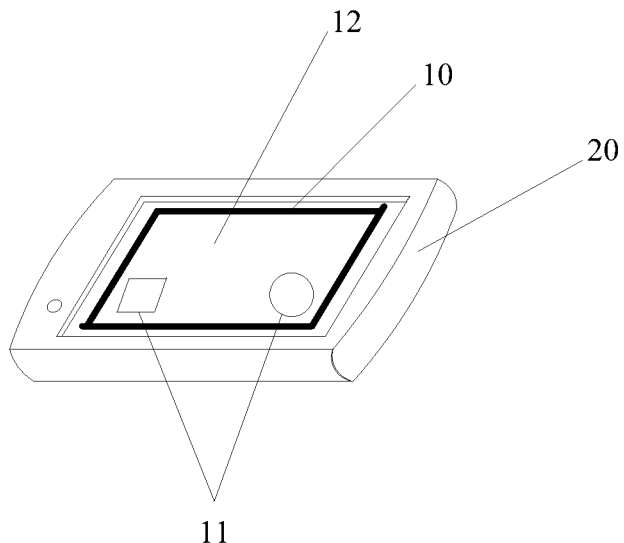
FIG. 1 is a schematic diagram of a GUI according to an embodiment of the present invention.

FIG. 1 is a schematic diagram of a GUI according to an embodiment of the present invention. Referring to FIG. 1, a GUI 10 is displayed on a display screen of a terminal device 20, and the terminal device 20 may be a terminal device such as a smart mobile phone, a tablet computer, or a notebook computer; the GUI 10 may include an interface element 11 and an interface background 12, where the interface element 11 is displayed over the interface background 12, for example, the interface element 11 may be displayed over the interface background 12 in a superimposed manner, it is obvious that the interface element 11 may also be displayed over the interface background 12 in another manner, which may specifically be that: the interface element 11 is a graphical layer, the interface background 12 is another graphical layer, and the graphical layer at which the interface element 11 is located over the graphical layer at which the interface background 12 is located; and the interface background 12 is an area for presenting interface content of the GUI, the interface element 11 may be operated by a user to trigger the terminal device 20 to generate a corresponding instruction, and the terminal device 20 implements an instruction function of the interface element 11 by executing the instruction.

An optional application manner of the GUI 10 may be using the GUI 10 as a GUI corresponding to video play; and therefore, the interface background 12 may be currently played video content, and the interface element 11 may be an interface element corresponding to an instruction such as pause or volume adjustment.

Figure 2:
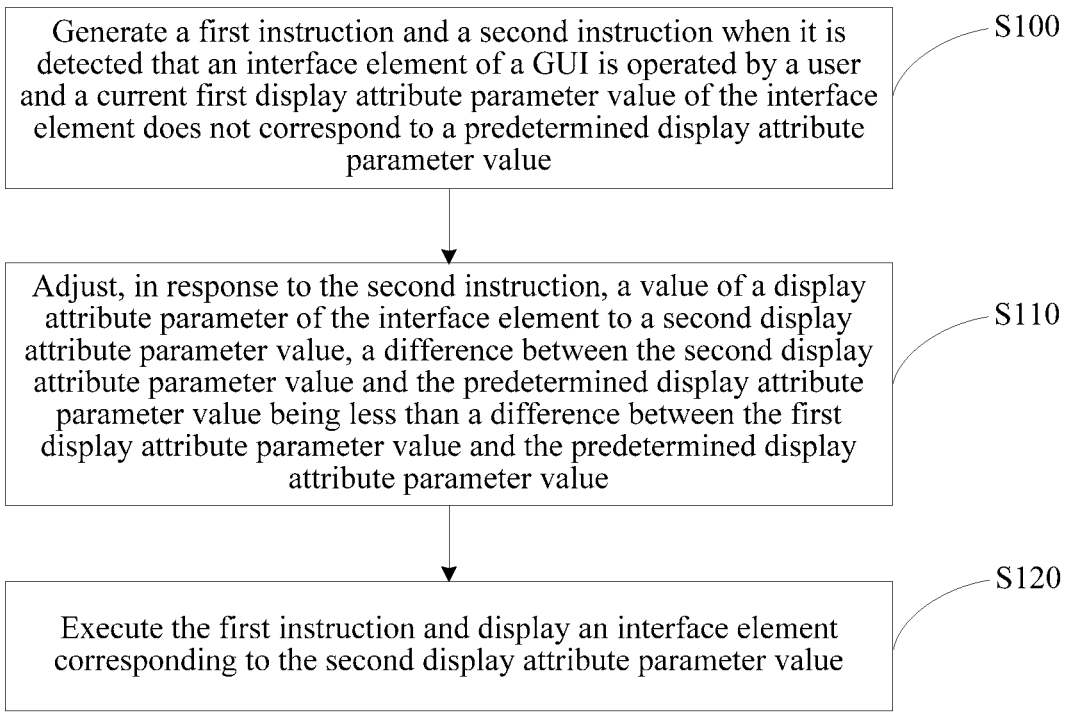
FIG. 2 is a flowchart of a GUI display method according to an embodiment of the present invention.

The GUI illustrated in the foregoing text is merely an optional form, and the embodiments of the present invention do not exclude a GUI in another form. A GUI display method according to an embodiment of the present invention is described below. FIG. 2 is a flowchart of the GUI display method according to the embodiment of the present invention, and the method may be applied to a terminal device capable of displaying a GUI. Referring to FIG. 2, the method may include:

Step S100: Generate a first instruction and a second instruction when it is detected that an interface element of a GUI is operated by a user and a current first display attribute parameter value of the interface element does not correspond to a predetermined display attribute parameter value.

The first instruction is used for controlling interface content presented on an interface background of the GUI, and the second instruction is used for triggering an adjustment on a value of a display attribute parameter of the interface element. Optionally, the display attribute parameter is used for representing a display attribute of an interface element, and the display attribute parameter may be a transparency parameter, a contrast parameter, a gray-scale parameter, a scale parameter, or the like.

Optionally, in this embodiment of the present invention, the first instruction may be regarded as an inherent instruction of an interface element, which is an inherent instruction provided by a GUI and generated under a user operation, and the second instruction may be regarded as an instruction additionally set for implementing the GUI display method according to this embodiment of the present invention. Optionally, the user operation may be a click operation; and in this embodiment of the present invention, when an interface element of a GUI is clicked by a user and a current value of a display attribute parameter (namely, a first display attribute parameter value) of the clicked interface element does not correspond to a predetermined display attribute parameter value, a first instruction and a second instruction are generated.

Step S110: Adjust, in response to the second instruction, the value of the display attribute parameter of the interface element to a second display attribute parameter value, a difference between the second display attribute parameter value and the predetermined display attribute parameter value being less than a difference between the first display attribute parameter value and the predetermined display attribute parameter value.

After the second instruction is generated, the terminal device may respond to the second instruction, so as to adjust the value of display attribute parameter of the interface element that is operated by the user, where the value of the display attribute parameter after the adjustment is a second display attribute parameter value, and a difference between the second display attribute parameter value and the predetermined display attribute parameter value is less than a difference between the current value of the display attribute parameter (namely, the first display attribute parameter value) of the interface element and the predetermined display attribute parameter value, so as to enable the second display attribute parameter value after the adjustment to get close to the predetermined display attribute parameter value. Obviously, the second display attribute parameter value after the adjustment may also be the predetermined display attribute parameter value, that is, after the terminal device performs, in response to the second instruction, an adjustment operation on the value of the display attribute parameter, the value of the display attribute parameter after the adjustment may reach the predetermined display attribute parameter value.

Optionally, for a terminal device having a graphic processing unit (GPU), when responding to the second instruction, the terminal device may first determine that a value of a display attribute parameter of the interface element after the adjustment is a second display attribute parameter value, and then control the GPU to adjust the value of the display attribute parameter of the interface element displayed on the display screen of the terminal device to the second display attribute parameter value.

Step S120: Execute the first instruction and display an interface element corresponding to the second display attribute parameter value.

As can be seen, when a current first display attribute parameter value of an interface element of a GUI does not correspond to a predetermined display attribute parameter value, if the interface element is operated by a user, a terminal device generates a first instruction and a second instruction; this embodiment of the present invention may implement, in response to the first instruction, an inherent function of the interface element, and in addition, adjust, in response to the second instruction, a value of a display attribute parameter of the interface element, so as to enable the value of the display attribute parameter after the adjustment to get close to or reach the predetermined display attribute parameter value.

In the GUI display method according to this embodiment of the present invention, when it is necessary to adjust a value of a display attribute parameter because a current first display attribute parameter value of an interface element of a GUI does not correspond to a predetermined display attribute parameter value, a first instruction and a second instruction are generated by operating the interface element, where the first instruction is used for controlling interface content presented on an interface background of the GUI, and the second instruction is used for triggering an adjustment on the value of the display attribute parameter of the interface element; in response to the second instruction, the value of the display attribute parameter of the interface element is adjusted to a second display attribute parameter value, so as to enable the second display attribute parameter value after the adjustment to get close to or reach the predetermined display attribute parameter value; and the first instruction is executed and an interface element corresponding to the second display attribute parameter value is displayed, so as to adjust the display attribute of the interface element while implementing an inherent function of the interface element. In this embodiment of the present invention, when it is necessary to adjust a display attribute of an interface element of a GUI, the interface element that needs to be adjusted can be operated without exiting the GUI, so as to generate a first instruction and a second instruction, and the value of the display attribute parameter of the interface element is adjusted while the first instruction is executed to implement an inherent function of the interface element at the same time, so as to enable the value of the display attribute parameter to get close to or reach a predetermined display attribute parameter value. In the GUI display method according to this embodiment of the present invention, the display attribute of the interface element can be adjusted by operating the interface element without exiting the GUI, so that an operating manner of adjusting the display attribute of the interface element is convenient and does not interrupt a user operation in the GUI.

Optionally, this embodiment of the present invention may set a predetermined display attribute parameter adjustment value, and adjust, according to the predetermined display attribute parameter value when the value of the display attribute parameter of the interface element does not correspond to the predetermined display attribute parameter value, the value of the display attribute parameter of the interface element once each time the user operates the interface element, so as to enable the value of the display attribute parameter of the interface element after the adjustment to get close to or reach the predetermined display attribute parameter value. Specifically, this embodiment of the present invention may respond, after the second instruction is generated, to the second instruction; determine, according to the predetermined display attribute parameter adjustment value, the value of the display attribute parameter of the interface element after the adjustment to be the second display attribute parameter value, where a difference between the second display attribute parameter value and the current value of the display attribute parameter (namely, the first display attribute parameter value) of the interface element corresponds to the display attribute parameter adjustment value; control, after the second display attribute parameter value is determined, the GPU to adjust the value of the display attribute parameter of the interface element from the first display attribute parameter value to the second display attribute parameter value, and specifically, adjust the value of the display attribute parameter in interface element display data provided by the GPU from the first display attribute parameter value to the second display attribute parameter value.

In order to make it easier to understand the foregoing description, description is given by using an example in which the display attribute parameter is a transparency parameter, the predetermined display attribute parameter value is a value of the transparency parameter that is set to 0, and a predetermined display attribute parameter adjustment value is 10% of the value of the transparency parameter when the interface element is completely displayed. If a current first display attribute parameter value of an interface element is 100 (the interface element is completely displayed), after it is detected that the interface element is operated by a user one time, the value of the transparency parameter may be adjusted to decrease by 10%, and the value of the transparency parameter is decreased from 100 to 90; if the interface element is operated by the user one more time, the value of the transparency parameter may further be adjusted to decrease by 10%, and the value of the transparency parameter is decreased from 90 to 80 until the value of the transparency parameter of the interface element decreases to the predetermined transparency parameter value of 0.

Optionally, when the display attribute parameter is a transparency parameter, and the first display attribute parameter value is a first transparency parameter value, in an implementation process of adjusting the value of the display attribute parameter to the second display attribute parameter value in this embodiment of the present invention, according to a predetermined transparency parameter adjustment value, the value of the transparency parameter of the interface element after the adjustment is determined to be a second transparency parameter value, and a difference between the second transparency parameter value and the first transparency parameter value corresponds to the predetermined transparency parameter adjustment value; hence, the GPU is controlled to adjust the value of the transparency parameter of the interface element from the first transparency parameter value to the second transparency parameter value; specifically, a value of a display parameter (alpha) corresponding to the transparency in the interface element display data provided by the GPU is adjusted from the first transparency parameter value to the second transparency parameter value; and further, an interface element corresponding to the second transparency parameter value is displayed on the display screen of the terminal device.

It should be noted that the manner of using the predetermined display attribute parameter adjustment value to adjust the value of the display attribute parameter is merely an optional manner, and this embodiment of the present invention does not exclude another manner of adjusting the value of the display attribute parameter to enable the value of the display attribute parameter after adjustment to get close to or reach the predetermined display attribute parameter value. For example, in this embodiment of the present invention, a limit value of a display attribute parameter may be set so as to use different display attribute parameter adjustment values under different values of the display attribute parameter. For example, if a current value of the display attribute parameter is greater than 50% of a full value of the display attribute parameter, in this embodiment of the present invention, the value of the display attribute parameter may be adjusted by using a relatively great (or relatively small) display attribute parameter adjustment value; if the current value of the display attribute parameter is less than 50% of the full value of the display attribute parameter, in this embodiment of the present invention, the value of the display attribute parameter may be adjusted by using a relatively small (or relatively great, corresponding to the situation that if a current value of the display attribute parameter is greater than 50% of a full value of the display attribute parameter, the value of the display attribute parameter is adjusted by using a relatively small display attribute parameter adjustment value) display attribute parameter adjustment value. In this embodiment of the present invention, different display attribute parameter adjustment values may be used with an operating order of the user as a boundary, for example, when the operating order of the user is before a predetermined operating order or after the predetermined operating order, different display attribute parameter adjustment values may be separately used to adjust the value of the display attribute parameter.

It should be noted that, in a case in which the display attribute parameter is a contrast parameter, a gray-scale parameter, a scale parameter, or the like, a principle for adjusting the value of the display attribute parameter is similar to that in the foregoing description of the corresponding part, which may be referred to and is not repeated herein again.

Figure 3:
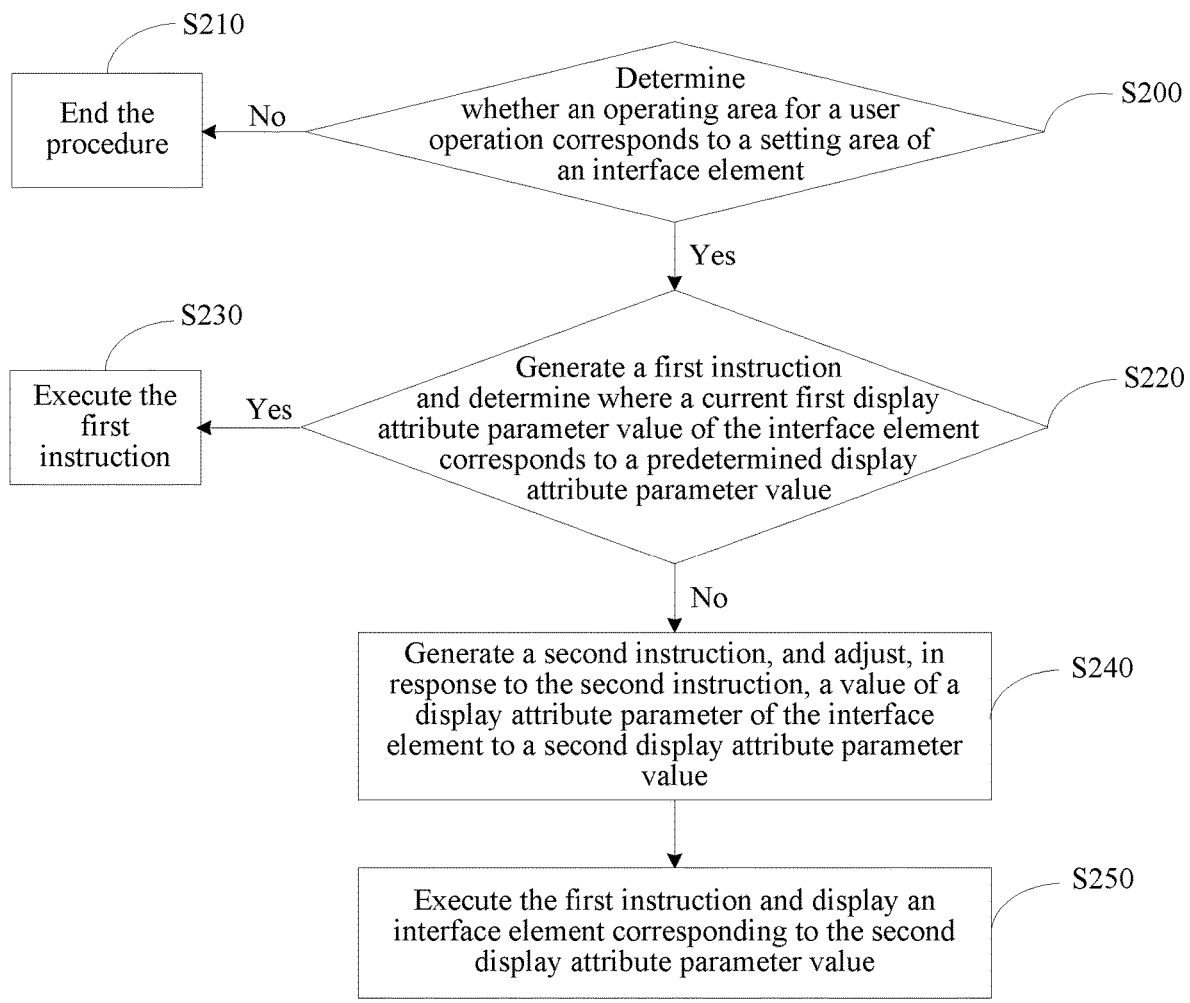
FIG. 3 is another flowchart of a GUI display method according to an embodiment of the present invention.

FIG. 3 is another flowchart of a GUI display method according to an embodiment of the present invention. Referring to FIG. 3, the method may include:

Step S200: Determine whether an operating area for a user operation corresponds to a setting area of an interface element, if not, perform step S210, and if yes, perform step S220.

Optionally, the user operation may be a click operation.

Step S210: End the procedure.

Step S220: Generate a first instruction and determine where a current first display attribute parameter value of the operated interface element corresponds to a predetermined display attribute parameter value, if yes, perform step S230, and if not, perform step S240.

Step S230: Execute the first instruction.

When the current first display attribute parameter value of the operated interface element reaches the predetermined display attribute parameter value, in this embodiment of the present invention, a second instruction may be masked, that is, the second instruction is not generated, and the display attribute of the interface element is not adjusted.

Step S240: Generate a second instruction, and adjust, in response to the second instruction, a value of a display attribute parameter of the interface element to a second display attribute parameter value.

The second display attribute parameter value, compared with the first display attribute parameter value, is closer to the predetermined display attribute parameter value or reaches the predetermined display attribute parameter value. Optionally, in this embodiment of the present invention, the value of the display attribute parameter of the interface element may be adjusted according to the predetermined display attribute parameter adjustment value, that is, after the adjustment, the difference between the second display attribute parameter value and the first display attribute parameter value corresponds to the predetermined display attribute parameter adjustment value.

Step S250: Execute the first instruction and display an interface element corresponding to the second display attribute parameter value.

Optionally, in this embodiment of the present invention, when it is detected that the interface element of the GUI is operated by the user, and the current value of the display attribute parameter of the interface element corresponds to the predetermined display attribute parameter value, this embodiment of the present invention may only generate the first instruction and mask the second instruction, so as to only execute the first instruction, thereby implementing the inherent function when the interface element is operated by the user.

Figure 4:
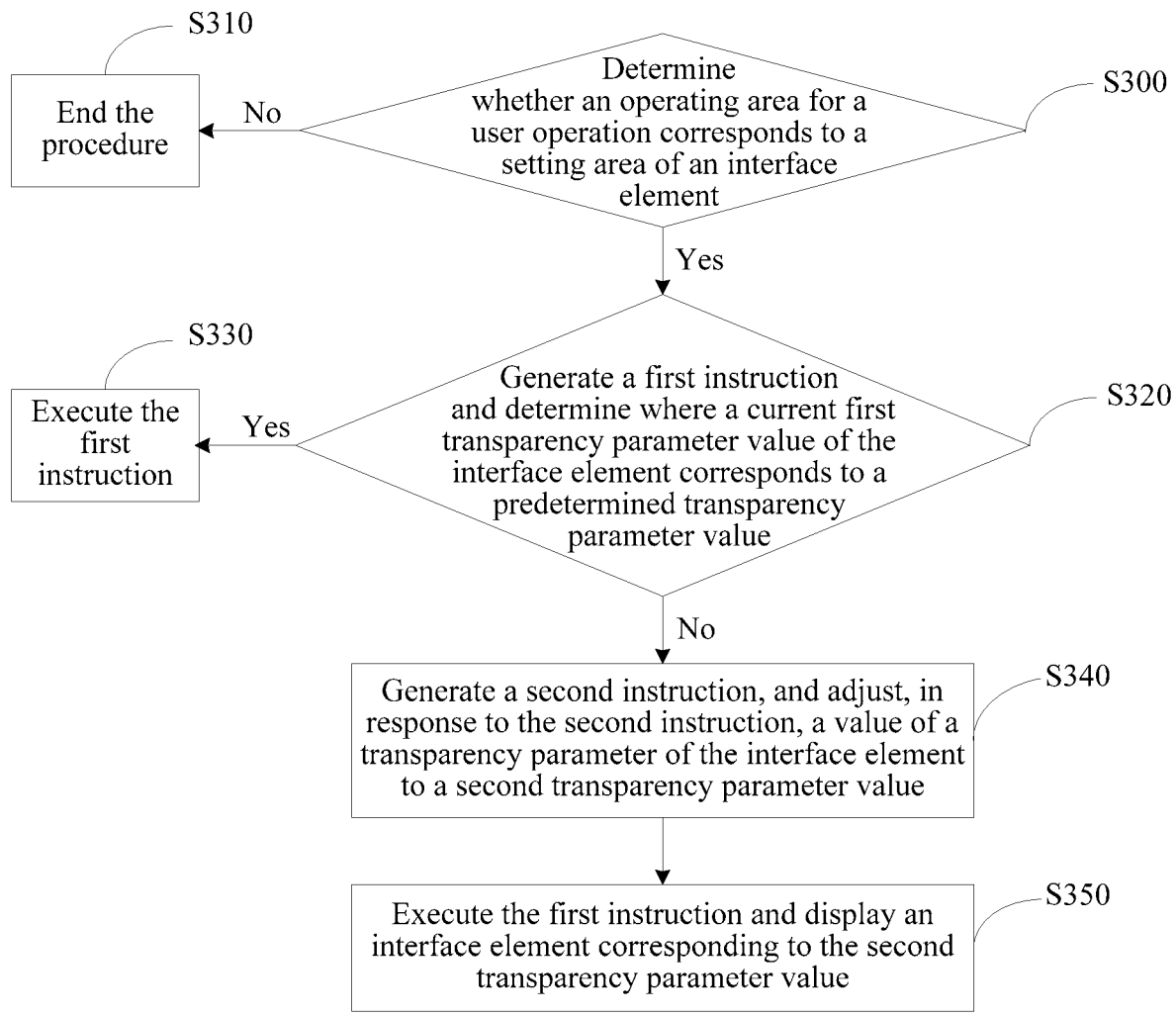
FIG. 4 is still another flowchart of a GUI display method according to an embodiment of the present invention.

A GUI display method according to an embodiment of the present invention is described below by using an example in which the display attribute parameter is a transparency parameter. FIG. 4 is still another flowchart of a GUI display method according to an embodiment of the present invention, and referring to FIG. 4, the method may include:

Step S300: Determine whether an operating area for a user operation corresponds to a setting area of an interface element, if not, perform step S310, and if yes, perform step S320.

Optionally, the user operation may be a click operation.

Step S310: End the procedure.

Step S320: Generate a first instruction and determine where a current first transparency parameter value of the operated interface element corresponds to a predetermined transparency parameter value, if yes, perform step S330, and if not, perform step S340.

Step S330: Execute the first instruction.

When the current first transparency parameter value of the operated interface element corresponds to the predetermined transparency parameter value, in this embodiment of the present invention, a second instruction may be masked, that is, the second instruction is not generated, and the transparency of the interface element is not adjusted.

Step S340: Generate a second instruction, and adjust, in response to the second instruction, a value of the transparency parameter of the interface element to a second transparency parameter value.

Step S350: Execute the first instruction and display an interface element corresponding to the second transparency parameter value.

Optionally, the predetermined display attribute parameter value may be a value of the transparency parameter that is set to 0, that is, the interface element is completely transparent, and when the interface element is completely transparent, an original display area of the interface element displays content presented on an interface background on which the interface element is superimposed. When the value of the transparency parameter of the interface element is 0, if the user still operates the original display area of the interface element, in this embodiment of the present invention, a first instruction may still be generated to implement an inherent function of the interface element, and meanwhile, a second instruction is masked, so that the value of the transparency parameter of the interface element is not further adjusted. Correspondingly, in this embodiment of the present invention, when the value of the transparency parameter of the interface element is 0, if it is detected that an operating area for a user operation corresponds to an operating hot zone of the interface element, a first instruction may be generated and the second instruction may be masked; and the first instruction is executed.

Figure 5:
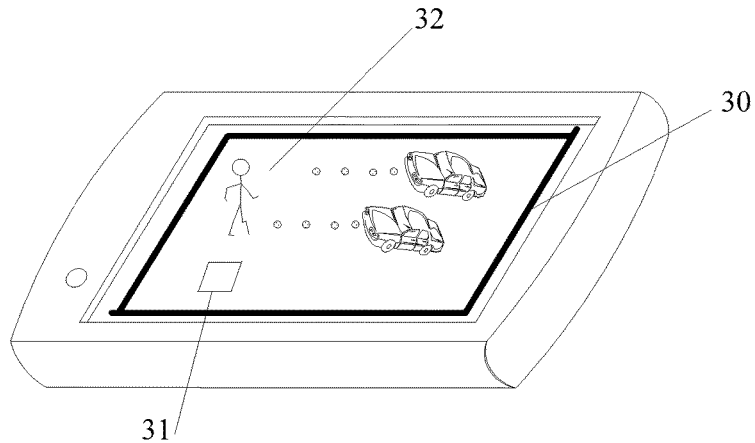
FIG. 5 is a schematic diagram of an application instance of a GUI display method according to an embodiment of the present invention.

FIG. 5 is a schematic diagram of an application instance of a GUI display method according to an embodiment of the present invention. In this application, a moving character is presented on an interface background 32 of a GUI 30, and an interface element 31 may be used for controlling a movement of the moving character (for example, controlling walking, jumping, and the like of the moving character); for example, in the character modeling field, a moving character after modeling may be presented on an interface background of a GUI, and the interface element may be used for controlling a movement of the character. By means of the GUI display method according to the foregoing embodiment of the present invention, a display attribute of the interface element 31 may be adjusted, and a specific adjusting manner is described below by using an example of adjusting the transparency of the interface element 31 (a principle of a manner of adjusting another display attribute is similar to that of a manner of adjusting the transparency):

When a user operates (for example, clicks) the interface element 31, if a value of the transparency parameter of the interface element 31 does not correspond to a predetermined transparency parameter value, a first instruction and a second instruction may be generated, where the first instruction is used for controlling a movement of the moving character presented on the interface background 32 of the GUI, and the second instruction is used for triggering an adjustment on the value of the transparency parameter of the interface element 31; and the value of the transparency parameter of the interface element may be adjusted, in response to the second instruction, to get close to or reach a predetermined transparency parameter value, so as to adjust the value of the transparency parameter of the interface element 31 while controlling the movement of the moving character. An optional process for adjusting the value of the transparency parameter may include: adjusting, according to the predetermined transparency parameter adjustment value, the value of the transparency parameter of the interface element 31 once each time the user operates the interface element 31.

When the value of the transparency parameter of the interface element 31 reaches the predetermined transparency parameter value, for an action that the user operates the interface element 31, in this embodiment of the present invention, only a first instruction is generated and a second instruction is masked, so that only the movement of the moving character is controlled and the value of the transparency parameter is not further adjusted.

Figure 6:
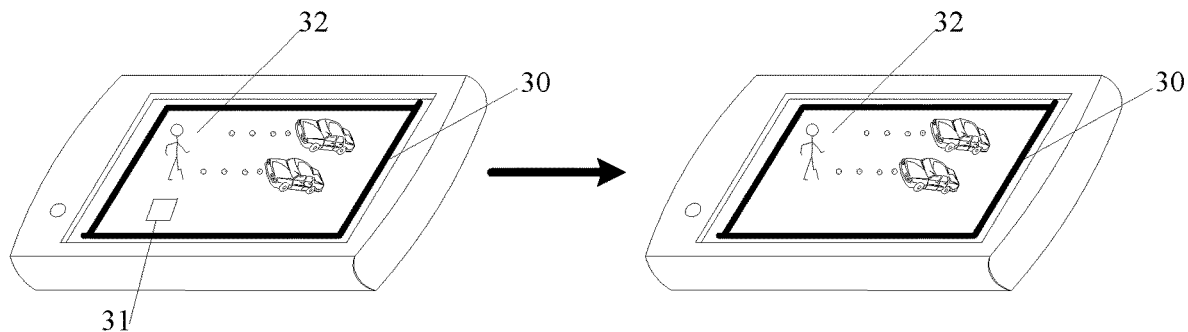
FIG. 6 is a schematic diagram illustrating two states of a GUI in an adjusting process according to an embodiment of the present invention.

By using an example in which the predetermined transparency parameter value is 0, FIG. 6 illustrates two states of a GUI in an adjusting process. When the value of the transparency parameter of the interface element 31 is 0, as shown in the right drawing of FIG. 6, an operating hot zone of the interface element 31 (namely, an original display area of the interface element 31) still exists in the GUI, although the operating hot zone is completely transparent, an operation of the user on the operating hot zone can still be detected, so that when the operating area for the user operation corresponds to the operating hot zone of the interface element, a first instruction is generated, and further the first instruction is executed to control a movement of the moving character.

In the GUI display method according to this embodiment of the present invention, the display attribute of the interface element can be adjusted by operating the interface element without exiting from the GUI, so that an operating manner of adjusting the display attribute of the interface element is convenient and does not interrupt a user operation in the GUI.

A GUI display apparatus according to an embodiment of the present invention is described below, and cross-reference may be made between the GUI display apparatus described below and the foregoing GUI display method.

Figure 7:
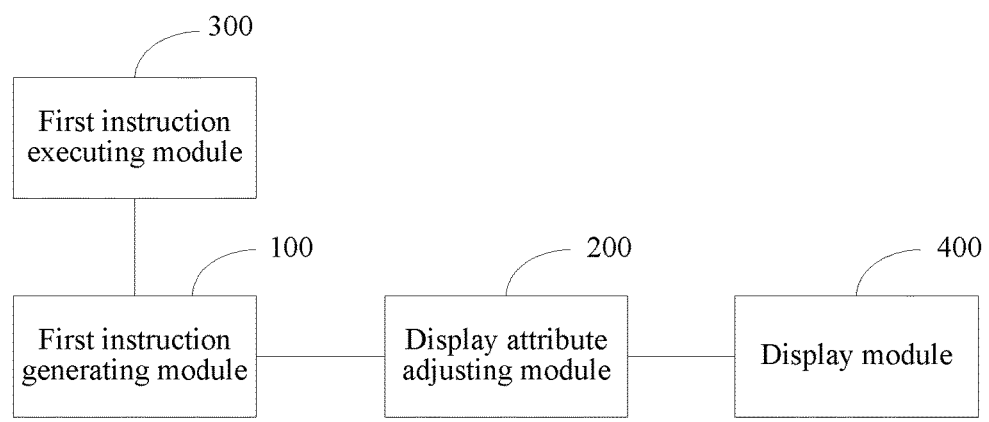
FIG. 7 is a structural block diagram of a GUI display apparatus according to an embodiment of the present invention.

FIG. 7 is a structural block diagram of a GUI display apparatus according to an embodiment of the present invention. The apparatus may be applied to a terminal device capable of displaying a GUI. Referring to FIG. 7, the apparatus may include:

a first instruction generating module 100, configured to generate a first instruction and a second instruction when it is detected that an interface element of a GUI is operated by a user and a current first display attribute parameter value of the interface element does not correspond to a predetermined display attribute parameter value, the first instruction being used for controlling interface content presented on an interface background of the GUI, and the second instruction being used for triggering an adjustment on a value of a display attribute parameter of the interface element;

a display attribute adjusting module 200, configured to adjust, in response to the second instruction, the value of the display attribute parameter of the interface element to a second display attribute parameter value, a difference between the second display attribute parameter value and the predetermined display attribute parameter value being less than a difference between the first display attribute parameter value and the predetermined display attribute parameter value;

a first instruction executing module 300, configured to execute the first instruction; and a display module 400, configured to display an interface element corresponding to the second display attribute parameter value.

Figure 8:
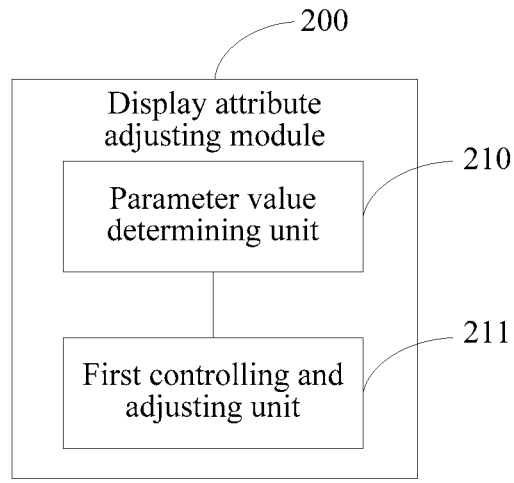
FIG. 8 is a structural block diagram of a display attribute adjusting module according to an embodiment of the present invention.

Optionally, FIG. 8 shows an optional structure of the display attribute adjusting module 200 according to an embodiment of the present invention. Referring to FIG. 8, the display attribute adjusting module 200 may include:

a parameter value determining unit 210, configured to determine, according to a predetermined display attribute parameter adjustment value, the value of the display attribute parameter of the interface element after the adjustment to be the second display attribute parameter value, where a difference between the second display attribute parameter value and the first display attribute parameter value corresponds to the predetermined display attribute parameter adjustment value; and a first controlling and adjusting unit 211, configured to control a GPU to adjust the value of the display attribute parameter of the interface element from the first display attribute parameter value to the determined second display attribute parameter value.

Optionally, the manner of using the predetermined display attribute parameter adjustment value to adjust the value of the display attribute parameter is merely an optional manner, and this embodiment of the present invention does not exclude another manner of adjusting the value of the display attribute parameter to enable the value of the display attribute parameter after adjustment to get close to or reach the predetermined display attribute parameter value.

Figure 9:
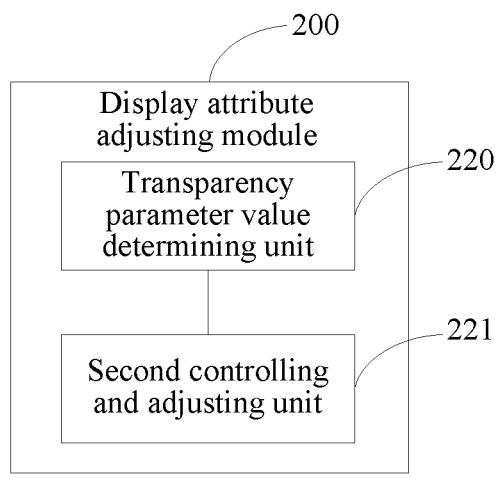
FIG. 9 is another structural block diagram of a display attribute adjusting module according to an embodiment of the present invention.

Optionally, the display attribute parameter may be a transparency parameter, the first display attribute parameter value may be a first transparency parameter value, and the second display attribute parameter value may be a second transparency parameter value. Correspondingly, FIG. 9 shows another optional structure of the display attribute adjusting module 200 according to an embodiment of the present invention. Referring to FIG. 9, the display attribute adjusting module 200 may include:

a transparency parameter value determining unit 220, configured to determine, according to a predetermined transparency parameter adjustment value, a value of the transparency parameter of the interface element after the adjustment to be a second transparency parameter value, where a difference between the second transparency parameter value and the first transparency parameter value corresponds to the predetermined transparency parameter adjustment value; and a second controlling and adjusting unit 221, configured to control a GPU to adjust the value of the transparency parameter of the interface element from the first transparency parameter value to the second transparency parameter value.

Figure 10:
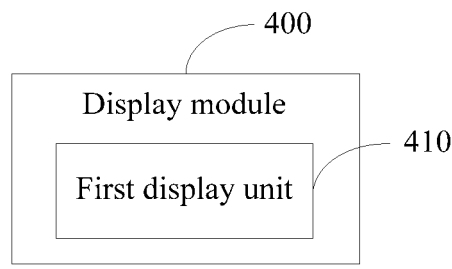
FIG. 10 is a structural block diagram of a display module according to an embodiment of the present invention.

Correspondingly, FIG. 10 shows an optional structure of the display module 400 according to an embodiment of the present invention. Referring to FIG. 10, the display module 400 may include:

a first display unit 410, configured to display an interface element corresponding to the second transparency parameter value.

Figure 11:
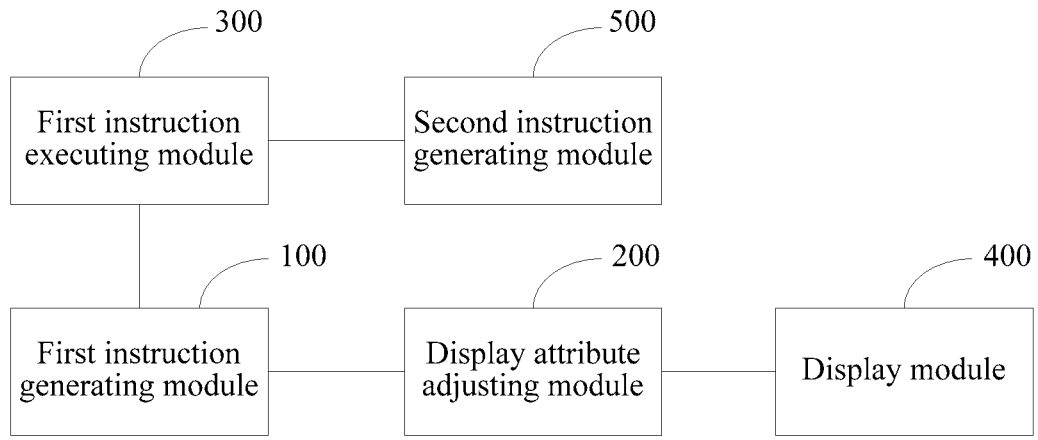
FIG. 11 is another structural block diagram of a GUI display apparatus according to an embodiment of the present invention.

Optionally, FIG. 11 shows another optional structure of the GUI display apparatus according to an embodiment of the present invention. With reference to FIG. 7 and FIG. 11, the GUI display apparatus may further include:

a second instruction generating module 500, configured to generate a first instruction and mask the second instruction when it is detected that the interface element of the GUI is operated by the user and a current value of the display attribute parameter of the interface element corresponds to the predetermined display attribute parameter value, so that the first instruction executing module executes the first instruction according to the generated first instruction.

Figure 12:
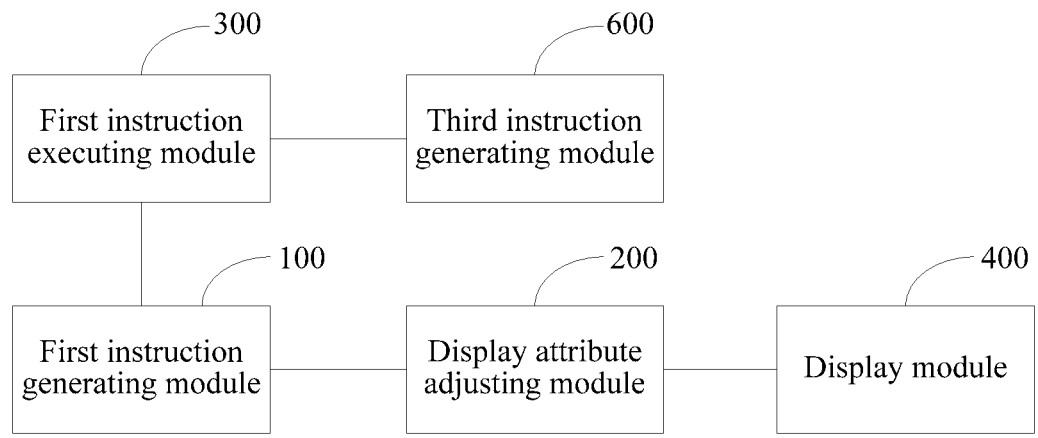
FIG. 12 is still another structural block diagram of a GUI display apparatus according to an embodiment of the present invention.

Optionally, the display attribute parameter may be a transparency parameter, and the predetermined display attribute parameter value may be a value of the transparency parameter that is set to 0; when the value of the transparency parameter of the interface element is 0, FIG. 12 shows still another optional structure of the GUI display apparatus according to an embodiment of the present invention. With reference to FIG. 7 and FIG. 12, the GUI display apparatus may further include:

a third instruction generating module 600, configured to generate the first instruction and mask the second instruction when it is detected that an operating area for a user operation corresponds to an operating hot zone of the interface element, so that the first instruction executing module executes the first instruction according to the generated first instruction.

Figure 13:
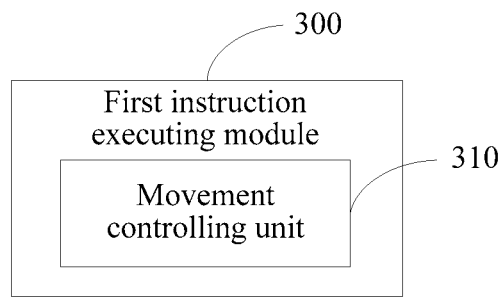
FIG. 13 is a structural block diagram of a first instruction executing module according to an embodiment of the present invention.

Optionally, an application instance of the GUI display apparatus according to this embodiment of the present invention is that a moving character is presented on an interface background of a GUI, and an interface element may be used for controlling a movement of the moving character (for example, controlling walking, jumping, and the like of the moving character); and correspondingly, FIG. 13 shows an optional structure of a first instruction executing module 300 according to an embodiment of the present invention, and referring to FIG. 13, the first instruction executing module 300 may include:

a movement controlling unit 310, configured to execute the first instruction, so as to control a movement of the moving character presented on the interface background of the GUI.

The GUI display apparatus according to this embodiment of the present invention can operate, when it is necessary to adjust a display attribute of an interface element of a GUI, the interface element that needs to be adjusted, without exiting from the GUI, so as to generate a first instruction and a second instruction, and can adjust a value of a display attribute parameter of the interface element while executing the first instruction to implement an inherent function of the interface element, so that the value of the display attribute parameter gets close to or reaches a predetermined display attribute parameter value. Hence, the display attribute of the interface element can be adjusted by operating the interface element without exiting from the GUI, so that an operating manner of adjusting the display attribute of the interface element is convenient and does not interrupt a user operation in the GUI.

Figure 14:
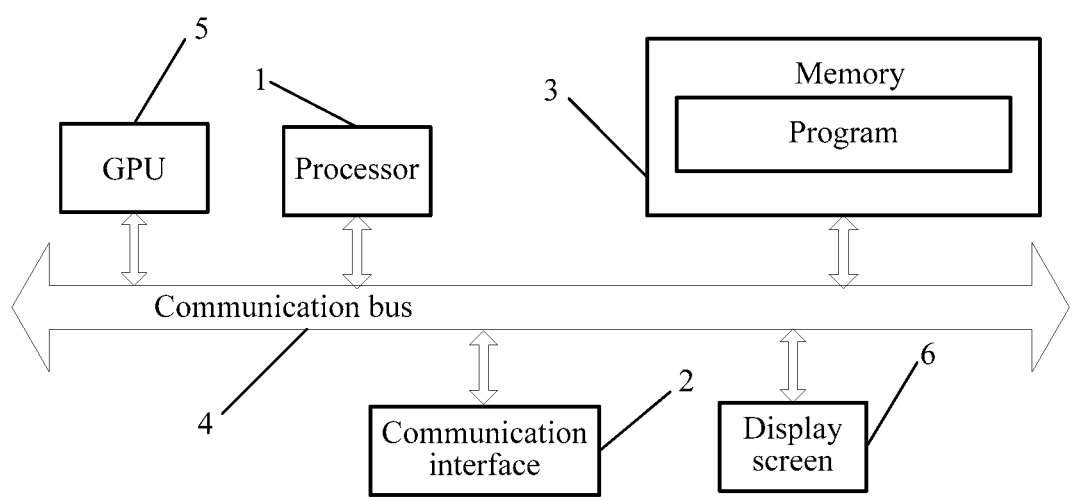
FIG. 14 is a structural block diagram of hardware of a terminal device according to an embodiment of the present invention.

An embodiment of the present invention further provides a terminal device, which can display a GUI, such as a smart mobile phone, a tablet computer, and a notebook computer; and the terminal device may include the foregoing GUI display apparatus. Reference may be made to the foregoing description of the corresponding part for description of the GUI, and the details are not repeated herein again A hardware structure of the terminal device according to this embodiment of the present invention is described below, and for a part involving a GUI display method below, reference may be made to the foregoing description of the corresponding part. FIG. 14 is a structural block diagram of hardware of a terminal device according to an embodiment of the present invention. Referring to FIG. 14, the terminal device may include:

a processor 1, a communication interface 2, a memory 3, a communication bus 4, a GPU 5, and a display screen 6.

Communication among the processor 1, the communication interface 2, the memory 3, the GPU 5, and the display screen 6 is implemented through the communication bus 4.

Optionally, the communication interface 2 may be an interface of a communication module, for example, an interface of a GSM module.

The processor 1 is configured to execute a program.

The memory 3 is configured to store a program.

The program may include a program code, and the program code includes a computer operating instruction.

The processor 1 may be a Central Processing Unit (CPU) or an Application Specific Integrated Circuit (ASIC) or may be configured as one or more integrated circuits for implementing the embodiments of the present invention.

The memory 3 may include a high-speed RAM memory, may also include a non-volatile memory, for example, at least one magnetic disk memory.

The program may be specifically used for:

generating a first instruction and a second instruction when it is detected that an interface element of a GUI is operated by a user and a current first display attribute parameter value of the interface element does not correspond to a predetermined display attribute parameter value, the first instruction being used for controlling interface content presented on an interface background of the GUI, and the second instruction being used for triggering an adjustment on a value of a display attribute parameter of the interface element;

adjusting, in response to the second instruction, the value of the display attribute parameter of the interface element to a second display attribute parameter value, a difference between the second display attribute parameter value and the predetermined display attribute parameter value being less than a difference between the first display attribute parameter value and the predetermined display attribute parameter value; and executing the first instruction and displaying an interface element corresponding to the second display attribute parameter value.

The embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

Persons skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the embodiments of the present invention.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The above description of the disclosed embodiments enables persons skilled in the art to implement or use the present invention. Various modifications to these embodiments are obvious to persons skilled in the art, the general principles defined in the present disclosure may be implemented in other embodiments without departing from the spirit and scope of the present invention. Therefore, the present invention is not limited to these embodiments illustrated in the present disclosure, but needs to conform to the broadest scope consistent with the principles and novel features disclosed in the present disclosure.

What is claimed is:

1. A graphical user interface (GUI) display method, performed at a terminal device having one or more processors and one or more memories for storing programs to be executed by the one or more processors, comprising:

presenting interface content on an interface background of the GUI and presenting an interface element at a graphical layer over the interface background;

detecting a user operation on the interface element;

upon said detecting, determining that a first value of the transparency parameter of the interface element does not correspond to a predetermined value of the transparency parameter of the interface element;

upon said determining, generating a first instruction and a second instruction, wherein the first instruction includes controlling the interface content corresponding to the user operation on the interface element, and wherein the second instruction includes triggering an adjustment of the first value of the transparency parameter of the interface element;

adjusting, in response to the second instruction, the first value of the transparency parameter of the interface element to a second value of the transparency parameter, comprising:

determining the second value of the transparency parameter according to a predetermined adjustment value, wherein the difference between the second value of the transparency parameter and the first value of the transparency parameter corresponds to the predetermined adjustment value, and wherein the difference between the second value of the transparency parameter and the predetermined value of the transparency parameter is less than the difference between the first display value of the transparency parameter and the predetermined value of the transparency parameter; and controlling, by the terminal device, a graphic processing unit (GPU) to adjust a value of the transparency parameter of the interface element from the first value to the second value; and executing the first instruction and displaying the interface element corresponding to the second value of the transparency parameter.

2. The GUI display method according to claim 1, wherein the method further comprises:

after adjusting the value of the transparency parameter of the interface element to the second value of the transparency, determining that the second value of the transparency parameter is the predetermined value of the transparency parameter, and detecting the same user operation performed on an operating hot zone of the interface element;

generating, by the terminal device, the first instruction and masking the second instruction in response to the same user operation; and executing, by the terminal device, the first instruction.

3. The GUI display method according to claim 1, wherein a moving character is presented on the interface background of the GUI; the interface element is used for controlling a movement of the moving character; and the executing, by the terminal device, the first instruction comprises:

executing, by the terminal device, the first instruction, so as to control the movement of the moving character presented on the interface background of the GUI.

4. A GUI display apparatus, comprising a hardware processor configured to execute program modules stored on a memory, the program modules cause the processor to perform:

presenting interface content on an interface background of the GUI and presenting an interface element at a graphical layer over the interface background;

detecting a user operation on the interface element;

upon said detecting, determining that a first value of the transparency parameter of the interface element does not correspond to a predetermined value of the transparency parameter of the interface element;

upon said determining, generating a first instruction and a second instruction, wherein the first instruction includes controlling the interface content corresponding to the user operation on the interface element, and wherein the second instruction includes triggering an adjustment of the first value of the transparency parameter of the interface element;

adjusting, in response to the second instruction, the first value of the transparency parameter of the interface element to a second value of the transparency parameter, comprising:

determining the second value of the transparency parameter according to a predetermined adjustment value, wherein the difference between the second value of the transparency parameter and the first value of the transparency parameter corresponds to the predetermined adjustment value, and wherein the difference between the second value of the transparency parameter and the predetermined value of the transparency parameter is less than the difference between the first display value of the transparency parameter and the predetermined value of the transparency parameter; and controlling a graphic processing unit (GPU) to adjust a value of the transparency parameter of the interface element from the first value to the second value; and executing the first instruction and displaying the interface element corresponding to the second value of the transparency parameter.

5. The GUI display apparatus according to claim 4, wherein the program modules further cause the processor to perform:

after adjusting the value of the transparency parameter of the interface element to the second value of the transparency parameter, determining that the second value of the transparency parameter is the predetermined value of the transparency parameter, and detecting the same user operation performed on an operating hot zone of the interface element;

generating the first instruction and masking the second instruction in response to the same user operation; and executing the first instruction.

6. The GUI display apparatus according to claim 4, wherein a moving character is presented on the interface background of the GUI; the interface element is used for controlling a movement of the moving character; and the processor is further configured to:

execute the first instruction, so as to control the movement of the moving character presented on the interface background of the GUI.

7. A non-transitory computer-readable medium having program code recorded thereon, wherein the program code, when being executed by a processor, causes the processor to:

present interface content on an interface background of the GUI and presenting an interface element at a graphical layer over the interface background;

detect a user operation on the interface element;

upon said detecting, determine that a first value of the transparency parameter of the interface element does not correspond to a predetermined value of the transparency parameter of the interface element;

upon said determining, generate a first instruction and a second instruction, wherein the first instruction includes controlling the interface content corresponding to the user operation on the interface element, and wherein the second instruction includes triggering an adjustment of the first value of the transparency parameter of the interface element;

adjust, in response to the second instruction, the first value of the transparency parameter of the interface element to a second value of the transparency parameter, comprising:

determining the second value of the transparency parameter according to a predetermined adjustment value, wherein the difference between the second value of the transparency parameter and the first value of the transparency parameter corresponds to the predetermined adjustment value, and wherein the difference between the second value of the transparency parameter and the predetermined value of the transparency parameter is less than the difference between the first display value of the transparency parameter and the predetermined value of the transparency parameter; and controlling, by the terminal device, a graphic processing unit (GPU) to adjust a value of the transparency parameter of the interface element from the first value to the second value; and execute the first instruction and displaying the interface element corresponding to the second value of the transparency parameter.

8. The non-transitory computer-readable medium of claim 7, wherein the program code causes the processor to:

after adjusting the value of the transparency parameter of the interface element to second value of the transparency parameter, determine that the second value of the transparency parameter is the predetermined value of the transparency parameter, and detect the same user operation performed on an operating hot zone of the interface element;

generate the first instruction and masking the second instruction in response to the same user operation; and execute the first instruction.

9. The non-transitory computer-readable medium of claim 7, wherein a moving character is presented on the interface background of the GUI, the interface element is used for controlling a movement of the moving character, and wherein executing the first instruction comprises executing the first instruction to control a movement of the moving character presented on the interface background of the GUI.

* * * * *